UNITED STATES PATENT OFFICE.

JACOB J. SCHALLER, OF CHICAGO, ILLINOIS.

CEMENT COMPOSITION.

1,351,874.   Specification of Letters Patent.   Patented Sept. 7, 1920.

No Drawing.   Application filed February 13, 1920. Serial No. 358,387.

*To all whom it may concern:*

Be it known that I, JACOB J. SCHALLER, a citizen of the United States, and a resident of Chicago, in the county of Cook and State of Illinois, have invented a certain new and useful Cement Composition, of which the following is a specification.

Among the objects of my invention is the production of a cement composition which does not deteriorate or granulate by the lapse of time, and which, on the contrary, improves by said lapse; to produce a cement composition which, being sufficiently hydrated to obtain the above recited results, will not be injured by the addition thereto of a quantity of water making it suitable for use under many varying conditions and with wide variation in materials with which it may be mixed or to which it may be applied. To produce a cement composition which permits the addition thereto of a suitable volume of water, prior to its inter-mixture with the material used or combined therewith, while at the same time the finished condition or product obtained, (or created) will not be subject to variation in character or volume by variation of climatic temperature or humidity; to produce a cement composition which is immune to the attack of insects, grubs, and worms.

My composition consists of a mixture of casein, lime, caustic soda and borax.

In preparing the composition I prefer to use the ingredients in about the following proportion, viz. twenty (20) pounds of casein, twenty (20) pounds of lime, two and one half (2½) pounds of caustic soda, and five (5) pounds of borax. Good results may be obtained, however, when the ingredients are varied within the following limits,— twenty (20) pounds of casein, thirty (30) pounds of lime, one and one quarter (1¼) pounds of caustic soda and two and one half (2½) pounds of borax.

These ingredients are mixed with a quantity of water sufficient to form a saturated solution of such consistency as to make a cement which can be thoroughly mixed with ground or finely cut straw, corn stalks, and other vegetable material.

My composition is light, is a fire resistant, is a very efficient non-conductor of heat, is impervious to water, adheres without cracking the body of the product obtained, when it dries, and, as a whole possesses in a high degree all the desired properties of a cement for ground or finely cut vegetable matter.

I claim:

A composition adapted to form a light weight cement for finely cut and ground vegetable material, comprising twenty pounds of casein, from twenty to thirty pounds of lime, from two and one half to one and one quarter pounds of caustic soda, and from five to two and one half pounds of borax.

JACOB J. SCHALLER.

In the presence of—
AGNES MURPHY,
J. M. GRAHAM.